US007752065B2

(12) United States Patent
Buzz

(10) Patent No.: US 7,752,065 B2
(45) Date of Patent: Jul. 6, 2010

(54) DIGITAL PERCENT COMPLETE PROCESS

(76) Inventor: Leonard Buzz, 1400 Woodlock Forest Dr., Woodlands, TX (US) 77380

( * ) Notice: Subject to any disclaimer, the term of this patent is extended or adjusted under 35 U.S.C. 154(b) by 1076 days.

(21) Appl. No.: 10/922,083

(22) Filed: Aug. 20, 2004

(65) Prior Publication Data
US 2005/0144893 A1 Jul. 7, 2005

Related U.S. Application Data

(60) Provisional application No. 60/496,405, filed on Aug. 20, 2003.

(51) Int. Cl.
*G05B 19/418* (2006.01)
*G06F 9/46* (2006.01)
(52) U.S. Cl. .................. 705/8; 705/7; 705/9; 703/1
(58) Field of Classification Search ............ 705/7–12; 703/1
See application file for complete search history.

(56) References Cited

U.S. PATENT DOCUMENTS

| | | | | |
|---|---|---|---|---|
| 5,016,170 | A * | 5/1991 | Pollalis et al. ............... | 705/7 |
| 5,526,520 | A * | 6/1996 | Krause ................... | 707/104.1 |
| 5,709,410 | A * | 1/1998 | Reeves, Jr. .................. | 283/67 |
| 5,765,140 | A * | 6/1998 | Knudson et al. ............. | 705/9 |
| 5,890,131 | A * | 3/1999 | Ebert et al. .................. | 705/7 |
| 5,950,206 | A * | 9/1999 | Krause ................... | 707/104.1 |
| 6,308,164 | B1 * | 10/2001 | Nummelin et al. ........... | 705/9 |
| 6,842,760 | B1 * | 1/2005 | Dorgan et al. ................ | 705/8 |
| 7,047,091 | B2 * | 5/2006 | Maschke .................... | 700/83 |
| 7,168,045 | B2 * | 1/2007 | Fliess et al. ................ | 715/771 |
| 7,191,141 | B2 * | 3/2007 | Motoyama ................... | 705/7 |
| 7,302,401 | B1 * | 11/2007 | Tervonen ..................... | 705/9 |
| 2002/0198755 | A1 * | 12/2002 | Birkner et al. .............. | 705/8 |
| 2003/0046134 | A1 * | 3/2003 | Frolick et al. ................ | 705/8 |
| 2003/0069716 | A1 * | 4/2003 | Martinez ................... | 702/188 |
| 2003/0171970 | A1 * | 9/2003 | Kinsella .................... | 705/9 |
| 2004/0030590 | A1 * | 2/2004 | Swan et al. ................. | 705/7 |
| 2007/0192156 | A1 * | 8/2007 | Gauger ....................... | 705/8 |

OTHER PUBLICATIONS

Schmidt, M. J., Schedule monitoring of engineering projects, IEEE Transactions on Engineering Management, vol. 35, Issue 2, May 1988, pp. 108-114.*
Basu, Abhi, Impact of information technology on construction project management, Transactions of AACE International; 1996; p. IT 4.1-4.5.*
Hernandez, Tomas Jr., Mobile CAD goes on site, Building Design & Construction; Sep. 2000; 41, 9; p. 19.*
Pitts, Marilyn, Check out the latest technology, Reeves Journal; Jun. 2001; 81, 6; p. 22-27.*

(Continued)

*Primary Examiner*—Jonathan G. Sterrett
*Assistant Examiner*—Nadja Chong Cruz
(74) *Attorney, Agent, or Firm*—PEI; Michael T. Perkins

(57) ABSTRACT

A method for tracking progress of a construction project is described. The method includes storing a digital representation of a construction project; and monitoring progress of the project. The method also includes comparing the progress with the digital representation and generating a graphical representation of the progress as a function of the digital representation. The progress includes a physical completion of said project and labor and material costs incurred for said physical completion.

11 Claims, 8 Drawing Sheets

OTHER PUBLICATIONS

Katzel, Jeanine, Mobile data collecting: Power in the palm of your hand, Plant Engineering; Sep. 2000; 54, 9; p. 50-56.*
Drake, Bob, Off-the-shelf software to enhance efficiency Rock Products; Jul. 1999; 102, 7; Research Library, p. 54-57.*
Anonymous, Companies develop palmtop software for civil engineers, Civil Engineering; Mar. 2000; 70, 3; p. 32.*
Coble et al, Multimedia communications for construction foremen AACE International Transactions; 1998; p. IT/IM.07.1-07.5.*
Hernandez, Tomas Jr., Going mobile, but CAD is back, Building Design & Construction; May 2001; 42, 5; p. 27-28.*
www.oncenter.com (http://web.archive.org/web/20010309200750/www.oncenter.com/) 2001-2002.*
www.timberline.com, (http://web.archive.org/web/20020124045428/http://www.timberline.com).*
www.ziatek.com (http://web.archive.org/web/20020122202813/http://www.ziatek.com).*

* cited by examiner

DIGITAL PERCENT COMPLETE PROCESS

RELATED APPLICATION

This application claims the benefit of prior U.S. Provisional Application 60/496,405 titled "Digital Percent Complete Process" filed Aug. 20, 2003, the subject matter of which is incorporated herein by reference in its entirety.

BACKGROUND

This invention relates to the field of construction and project management. In particular this invention relates to the management of materials, labor, scheduling and billing for construction projects A construction professional must effectively manage construction projects and be able to control costs in order to return a profit for any given project. Therefore, it is important that a construction professional monitor closely things like labor costs, material costs etc. and it would be ideal if the construction professional could capture and analyze these costs at any given moment. Currently there is a considerable time delay between when a cost is occurred at the jobsite and the construction professionals realize a labor activity is not being produced at the estimated production rate. Often by the time the mistake is realized it is too late in the construction process to correct the production mistake, because the labor budget is already expended for that activity. In other words, the earlier a process could indicate areas of concern, the more likely that a construction professional would be able to fix the problem and stay within the project budget.

SUMMARY

In one aspect, a method for tracking progress of a construction project is described. The method includes storing a digital representation of a construction project; and monitoring progress of the project. The method also includes comparing the progress with a digital representation and generating a graphical representation of the progress as a function of the digital representation. The progress includes a physical completion of said project and labor and material costs incurred for said physical completion.

BRIEF DESCRIPTION OF THE DRAWINGS

The accompanying drawings, which are incorporated in and constitute a part of the specification, illustrate and embodiment of the invention and, together with the description explain the invention.

REFERENCE CHARACTER(S) LIST

Figure 1:
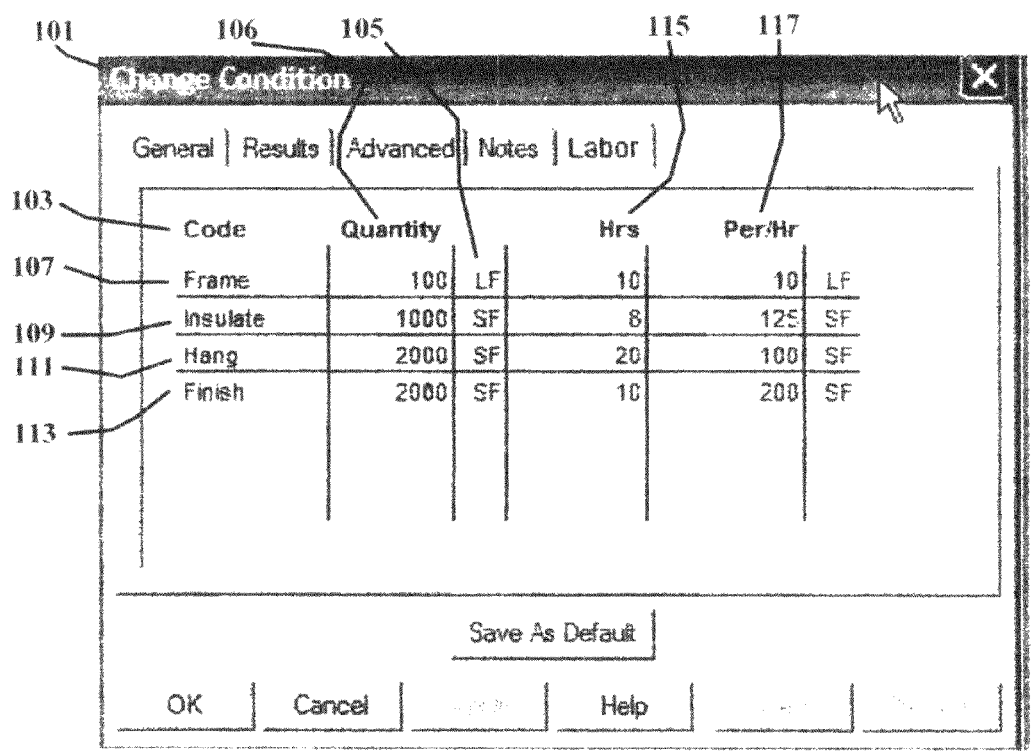
FIG. 1 illustrates labor cost codes, quantity, hours and production rates needed to construct a takeoff item.

| Part # | Part title |
| --- | --- |
| 101 | Digital estimate |
| 103 | Labor code(s) |
| 105 | Linear footage |
| 106 | Quantity |
| 107 | Frame |
| 109 | Insulation |
| 111 | Hang |
| 113 | Finish |
| 115 | Estimated hours |
| 117 | Production rate |
| 121 | Digital time card |
| 123 | Site supervisor |
| 125 | Submit time card button |
| 127 | Work details |
| 131 | Frame U/G wall(s) |
| 133 | Partitions |
| 135 | Percent complete |
| 137 | Image view |
| 139 | Objects |
| 141 | Percent complete scale |
| 143 | Numeric value |
| 145 | Image |
| 151 | Selection list |
| 153 | Objects counted |
| 154 | Orange color (indicator box) |
| 155 | Frame wall |
| 157 | Red color (indicator box) |
| 159 | production |
| 161 | Digital percent complete files |
| 163 | Takeoff objects |
| 164 | Orange |
| 165 | Plan image |
| 167 | Estimated hours |
| 171 | Budget (screen, sheet view) |
| 173 | Cost codes |
| 175 | Hours |
| 177 | Remaining (hours to complete) |
| 181 | Budget spreadsheet |
| 183 | Actual (hours, %'s by cost code) |
| 185 | Projected ($'s, hours, over/under) |
| 187 | Cost code column |
| 189 | Total quantity column |
| 191 | Installed quantity column |
| 193 | % complete column |
| 195 | Estimated hours column |
| 197 | Hours used column |
| 199 | Hours over/under column |
| 201 | Projected budget column |
| 203 | Projected hours column |
| 205 | Projected hours over/under |

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

The digital percent compete process may provide construction professionals with instant feedback on the adherence of a construction project to its budget. Real time information may permit construction professionals to react quickly to rectify production problems at the jobsite.

The digital percent complete process produces a highly accurate percentage value of materials or labor that have been used or installed on a project at any point in time. This information is cross-referenced with payroll information that is entered into a digital time card to produce instant job costing calculations.

The digital percent complete process starts with a digital estimate for a project coloring or marking items that are to be counted in the field. An estimator performs quantity takeoff for a project using digital plans and on-screen takeoff software. This is achieved by using a digital image of the construction plans and computer software to trace over the plan image to quantify construction items. The estimator colors and counts by highlighting construction items with the on-screen takeoff software.

Upon completion of the digital estimate, labor values associated with each takeoff condition counted during the estimating process may be added to the digital estimate file.

At this point, the digital estimate 101 may include labor codes 103 associated with each takeoff object.

For example, a linear object on the takeoff item may represent the counting of linear footage 105 for a particular wall type. This wall may have multiple labor steps needed to construct the wall such as frame 107, insulate 109, hang 111, and finish 113. (See FIG. 1)

Each of these labor activities may have a unique labor code and the estimated hours 115 and production rate 117 needed to install and complete the particular wall type for example.

The digital estimate file may then be used as a basis for producing a file that can be used on a job site where the takeoff items counted will be constructed. This digital file loaded with labor cost codes 103, quantities 106 and hours 115 may now be used with an electronic timesheet to perform the digital percent complete process at the jobsite.

The digital percent complete process allows jobsite personnel, utilizing a tablet or other handheld PC, to count or mark off material or labor activities as they are built or installed at the jobsite.

Once marked or counted, the digital percent complete process may provide a precise percentage of the original total quantity of labor or material that has been built or installed at the jobsite.

Figure 2:
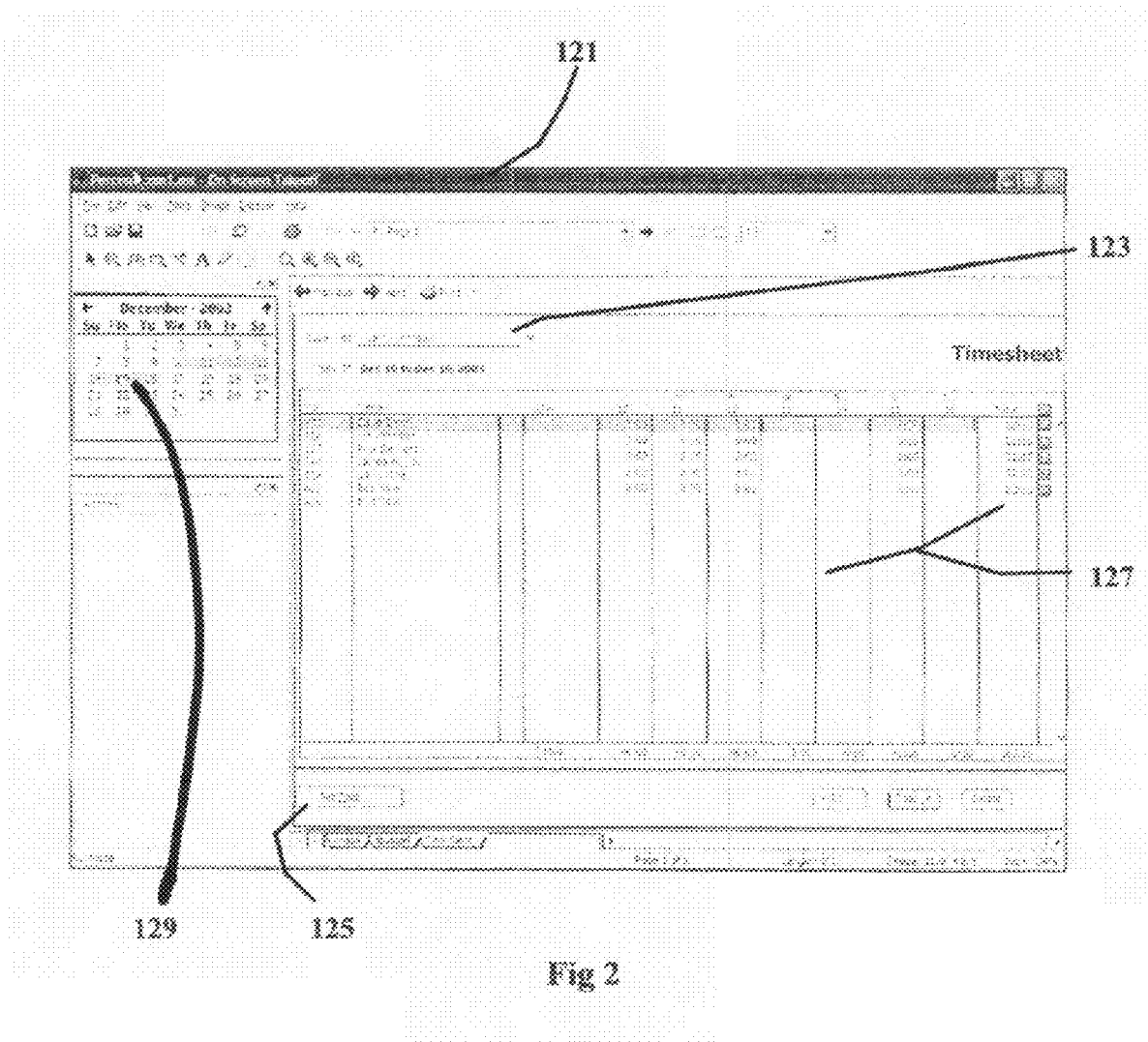
FIG. 2 illustrates a digital time card.

FIG. 2 illustrates a digital time card 121 used with the digital percent complete process to allow the job site supervisor 123 to quickly enter hours worked for each employee at his or her job location. The digital percent complete process may capture payroll information daily and posting the time card information to the creator or project manager of the digital percent complete process file. This process may consist of the job site supervisor 123 entering detail 127 and clicking on a submit time cards button 125 to post the file. The updated file may then be transferred via a network or other transport layer to the digital percent complete process file running at the project manager's machine. The network may be the internet; it may also be a wireless connection.

The digital percent complete process provides instant color-coded visual feedback for jobsite personnel; the feedback may indicate whether a particular project in on, close or over projected cost budget. Once items are marked or counted at the jobsite, the takeoff objects may change to specific colors and patterns that designate color-coded cues of how well the job is going from an on time/on budget or over time/over budget perspective. The digital percent complete file may simultaneously display this information at the jobsite and/or at the project supervisor's computer back at other locations such as the supervisor's office. Construction professionals at the jobsite and off-site may obtain instant color-coded visual feedback on the progress of the project.

A specific color and pattern scheme may be used in the digital percent complete process. The three object types that may be used in a digital takeoff are linear, area and count. These takeoff objects may all utilize a unique color and pattern scheme during the digital percent complete process.

Linear objects may be used to count items such as wall, heating piping etc. Area objects may be used to count the square footage for items such as roofs, concrete slabs, ceilings, etc. Count objects may be used to count single occurrences of items such as doors, windows, etc.

The digital percent complete file may display a complete list of all labor codes that exist on the current plan image displayed. This file may be used to select a digital image for the floor or area that is currently being worked on. This digital image may display a list of all labor activities that exist on the displayed digital image.

Figure 3:
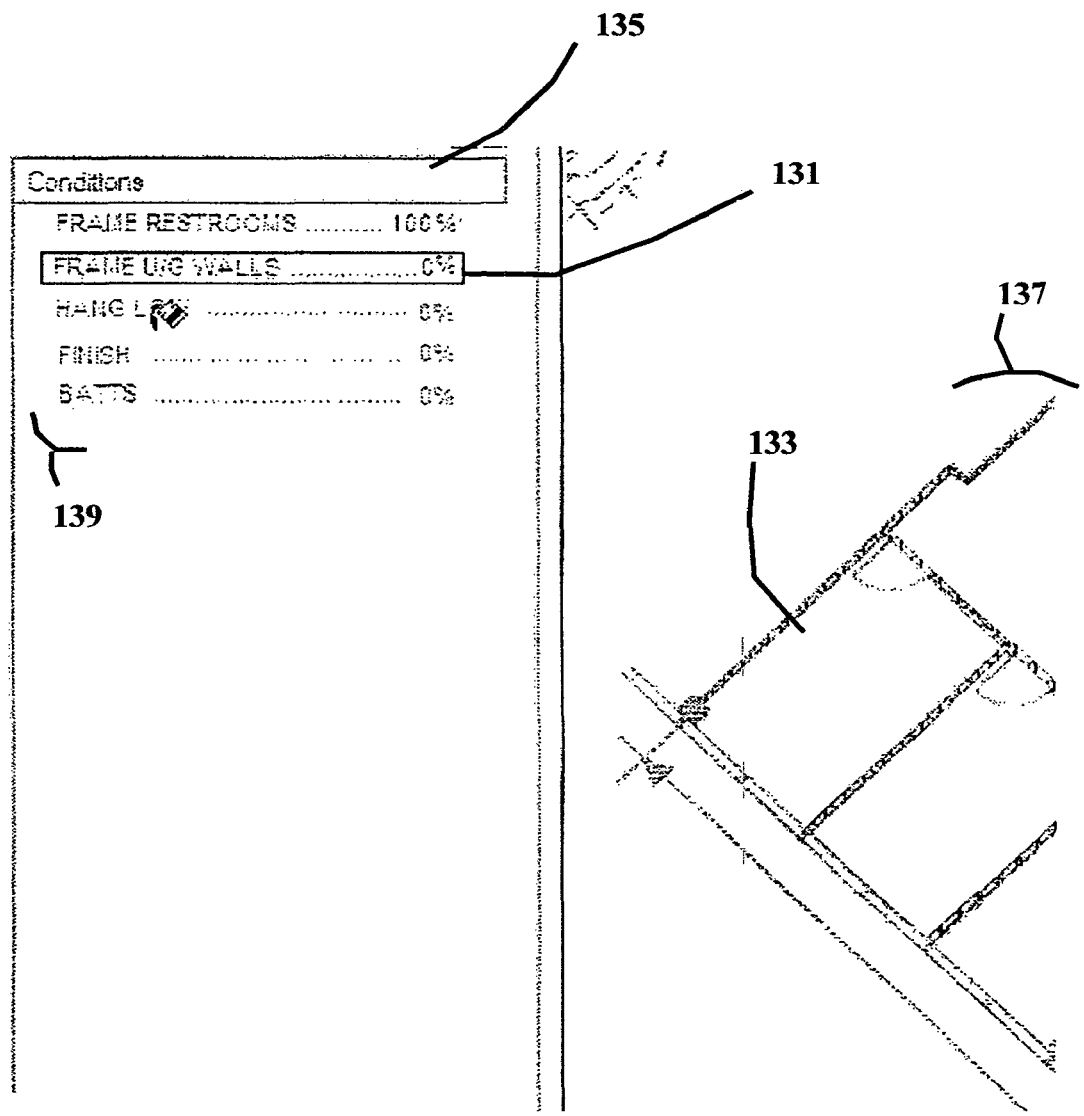
FIG. 3 illustrates a labor cost code frame.

The digital percent complete file allows the jobsite supervisor to select a labor cost code and all takeoff objects on the plan image that contain that labor cost code will display a blue color and become active or selectable. As illustrated in FIG. 3, the labor cost code frame U/G wall 131 is highlighted; all partitions 133 that contain this labor activity would be in blue. All labor code objects would begin with a blue color designating that they have not yet commenced.

The process may be the same for linear, area, and count objects. That is, all objects that contain the selected labor cost codes may become active and selectable on an image view 137 of the plans.

Once the labor cost code has been selected, the takeoff objects that are associated with that labor cost code may appear on the digital plan image in their color and pattern state. Objects 139 that are associated with the selected labor cost code may be displayed in an active state in the image view 137. All non-selected objects may appear in a grey non-active state.

The percent complete 135 value that is displayed for the given labor cost code may be based on the image view 137 and all of the associated objects for that given labor cost code. As the objects changed in the digital percent complete process value the percent complete 135 calculation should change accordingly in the labor dialog.

Figure 4:
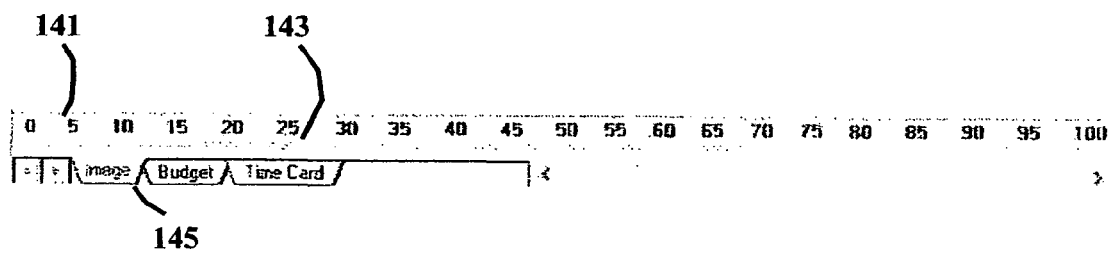
FIG. 4 illustrates a percent complete scale.

When the jobsite supervisor selects a labor cost code and then selects takeoff objects that contain that code, a percent complete scale 141 as illustrated in FIG. 4 may be displayed at the lower portion of the plan image 145. Once a takeoff object is highlighted or selected, the jobsite supervisor may click on any numeric value 143 on the percent complete scale 141 that represents the percentage completion of that takeoff object. The jobsite supervisor may select linear, area, or count items daily as they are built and may enter the labor and cost code information for hours worked on their projects.

Takeoff objects that are marked between 5% and 95% complete may display a pattern rather than a solid color. Pattern colors may indicate that a particular takeoff object is in the process of being constructed. This designation may assist the jobsite supervisor to see which takeoff items are currently being constructed and counted.

Once takeoff objects for a specific labor cost code is counted as 100 percent complete, the takeoff object may be displayed in a solid color. The display color for the takeoff object may be determined by the over/under budget calculation. This calculation may be applied continually and takeoff objects may change color depending on the total number of hours that are reported against it as compared to the original hours estimated to complete it.

For example, takeoff objects that are 100 percent complete and accomplished under estimated hours may display a green color. Takeoff objects that are 100 percent complete and accomplished at no more than 5 percent over estimated hours may display an orange color. Takeoff objects 100 percent complete and accomplished at greater than 5 percent over the estimated hours may display a red color. As labor hours and takeoff objects are counted, the labor cost codes selection list may change colors to convey budget status.

Figure 5:
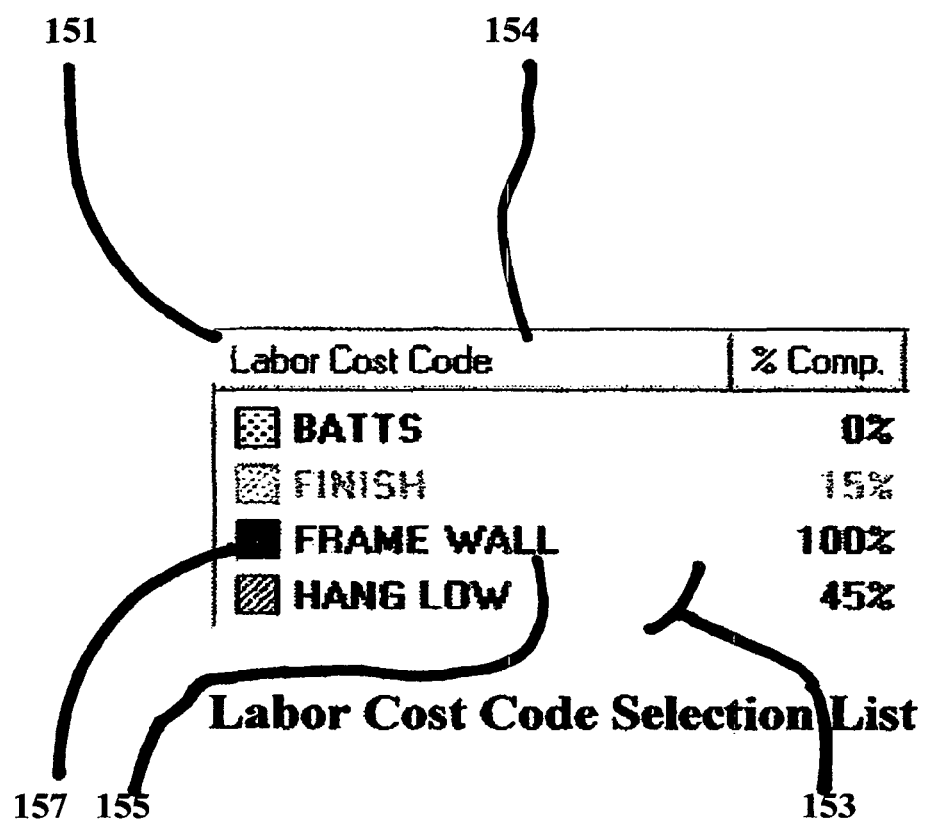
FIG. 5 illustrates a labor cost code selection list.

FIG. 5 illustrates a typical labor cost code selection list 151. The finish cost code includes objects counted 153 and labor hours reported for it and displays an orange color 154 signifying that it is over budget by no more than 5 percent. The frame wall 155 cost code also includes objects counted and hours reported for it and displays a red color 157 signifying that it is no more than 5 percent over budget.

Depending on the amount of production 159 that is achieved in the future and hours reported, it is possible for a cost code to change from red (over budget) back to green (under budget).

Figure 6:
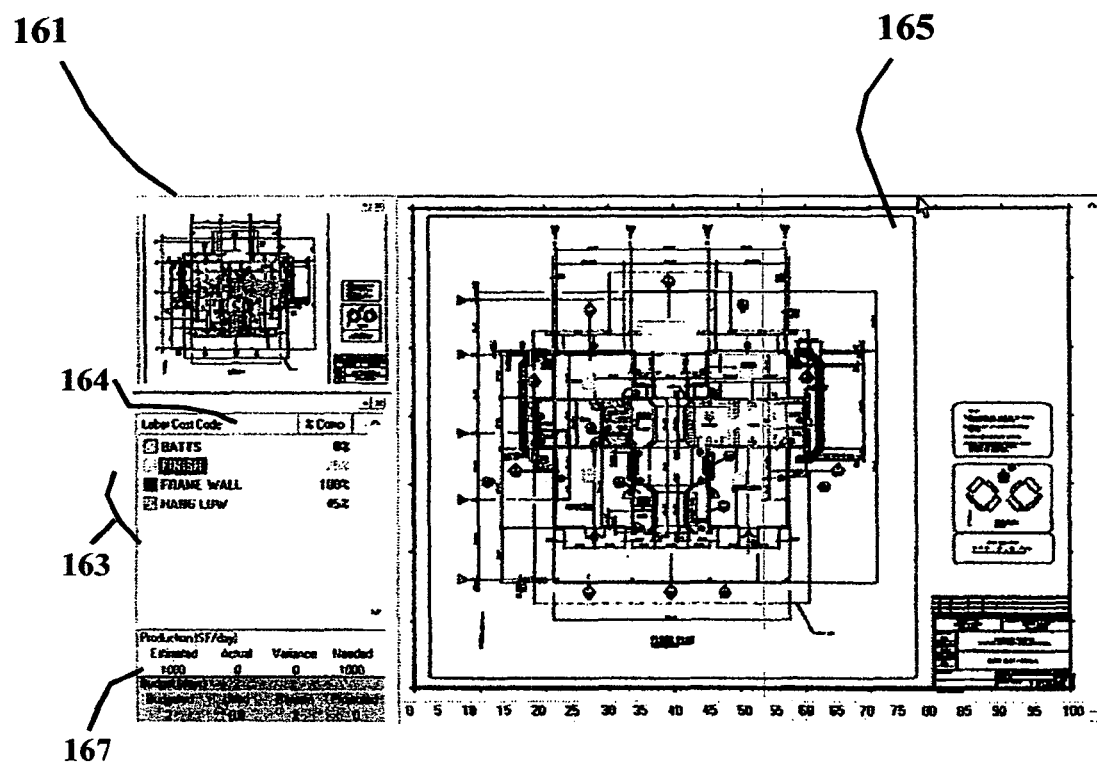
FIG. 6 illustrates a digital percent complete file showing finish cost code and associated takeoff objects that are viewable and selectable.

FIG. 6 illustrates a typical digital percent complete file 161 showing finish cost codes. In this illustration, the plan image 165 displays only takeoff objects 163 that contain the finish labor cost code. The finish code is orange 164 in this case because it is currently less than 5 percent over budget.

Job site supervisors and office management can see visually color coded plan images 165 showing items as they are being constructed. The jobsite supervisor's goal is to keep all labor activities under the estimated hours 167. This would result in a plan image with all takeoff objects displaying in a green color.

Figure 7:
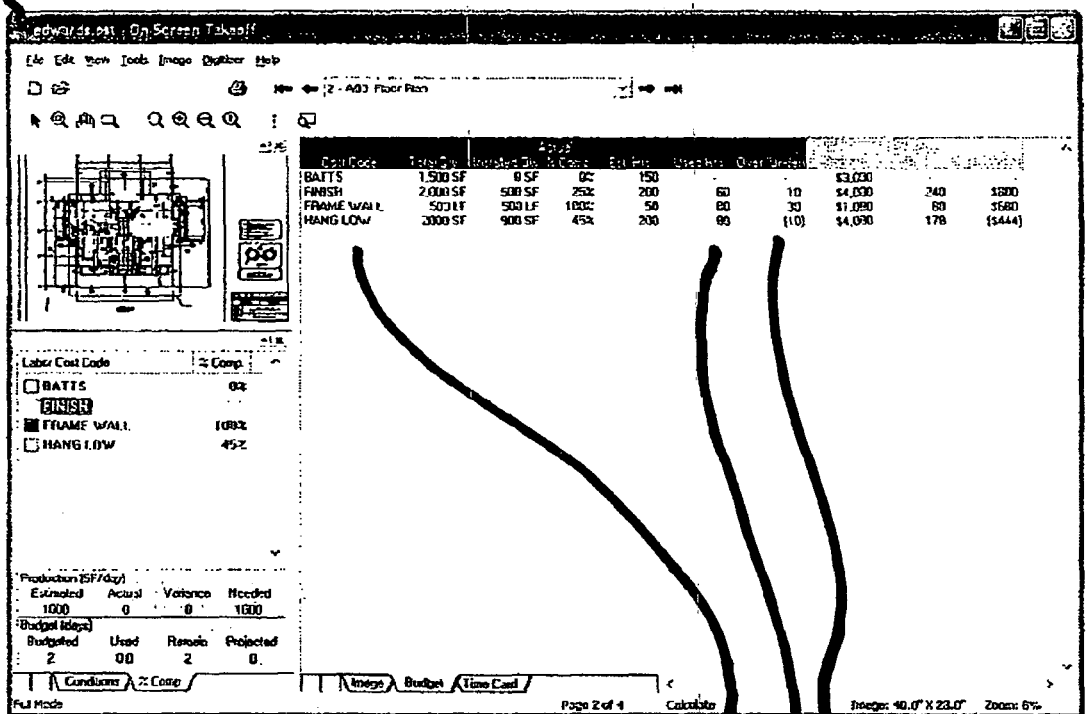
FIG. 7 illustrates digital percent complete budget view showing overall job status.

FIG. 7 illustrates a typical budget 171 sheet view of an entire construction project showing all cost codes 173 and hours 175 used and remaining 177 for the project.

Figure 8:
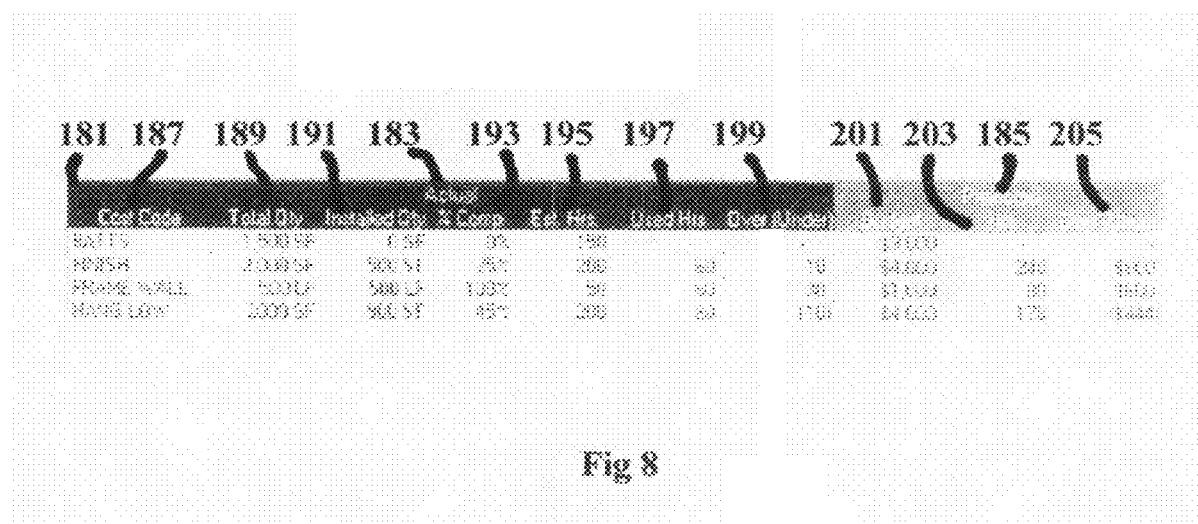
FIG. 8 illustrates a budget view showing actual and projected job costs.

FIG. 8 illustrates a budget spreadsheet 181 divided into two distinct areas, the actual 183 and the projected 185. The budget sheet 181 may display the following information:

cost code column 187—the list of labor cost codes in alphabetical order for the entire project;

total qty column 189—the total quantity of the labor cost codes for the entire project;

installed qty column 191—the installed quantity for the given labor cost code for the entire project which calculates the digital percent complete value across all pages for a given labor cost code and calculates the amount of work installed;

% comp. column 193 the quantity installed/total quantity for the given labor cost code for the entire project; estimated hours column 195—the total hours for the given labor cost code that is derived form the labor detail information from Quick Bid or the labor tab in the condition dialog from on-screen takeoff;

hours used column 197—the total hours entered per labor cost code on the time card tab for the entire project;

hours over/under column 199—the hours used—(estimated hrs multiplied by percent complete) for a given labor cost code for the entire project;

projected budget column 201—the (hours used divided by percent complete)/estimated hours for a given labor cost code for the entire project;

projected hours column 203—the estimated hours multiplied by the projected budget;

projected hours over/under 205 —the projected hours minus the estimated hours for a given labor cost code for the entire project;

The methods described above may be implemented on a computer. The computer may be a general purpose computer that is stationary (i.e. desktop) or portable (such as a laptop or a tablet PC or a PDA). The method may also be implemented via software as a computer program encoded on a machine readable medium. The medium may be a floppy or a compact disc for example.

While specific colors have been cited in the above described invention, it is understood that other color schemes, including shades of gray, black and white, may also be used to illustrate the project completion and costs.

The foregoing description of exemplar embodiments of the present invention provides illustration and description, but it is not intended to be exhaustive or to limit the invention to the precise form disclosed. Modifications and variations are possible in light of the above teachings or may be acquired from practice of the invention.

The following claims and their equivalents define the scope of the invention.

What is claimed is:

1. An interactive computer method for tracking percentage of completion of a construction project takeoff object steps compared to previous project status through a site plan image drawing screen, the method comprising the steps of:

storing a digital estimation files of construction project drawings with project progress threshold designating embedded color and pattern-coded labor takeoff object steps displaying plans, objects, object steps, estimates, and budgets in a mobile interactive computer;

monitoring percent complete progress of the construction project through a digital centric computer screen display with numeric, graphical, color and pattern coded objects and object steps;

updating labor takeoff object steps percentage of completion images, estimates, and budgets through a remote, onsite computer with a site supervisor observing physical completion of takeoff object steps and direct screen selection inputs as the project progress is achieved;

comparing the project labor takeoff object steps percentage of completion progress with the digital estimation file through computer visual screen displays with numeric, graphical, and color coded takeoff object steps within drawings displaying changing colors and patterns as project progress is achieved;

generating an updated graphical digital file image of the percentage of completion of object steps within drawings of the project progress as a function of the digital file image items, wherein the project progress further comprises:

a collection of labor takeoff object steps percentage of completion within an image displaying physical completion of the project progress, a color coded construction plan image containing labor takeoff objects and object steps associated labor and material costs wherein a takeoff object completion status is represented by tracking project progress related designated changing pattern and color coded takeoff objects steps incurred for said physical completion with solid color indicating over/under budget completion; and transferring in real time labor takeoff object steps percentage of completion information by network from remote sites to a project manager's office facilitating complete project status monitoring by takeoff object steps; wherein the completion information contains current drawings budget status, plans, estimates, and budget for immediate corrective action or adaptation of resources.

2. The interactive computer method for tracking progress of a construction project of claim 1 wherein the storing of the digital estimation file comprises:

an on image display of labor takeoff object steps percentage of completion with an instant changeable color and pattern-coded feedback scheme for representing:

percentage completion of the labor takeoff object steps and adherence to a pre-determined budget based on evaluating the project incurred labor and material costs of labor takeoff object steps as compared to real time direct onsite observation.

3. The interactive computer method for tracking progress of a construction project of claim 1 further comprising the real time storing of the digital estimate file of a construction project containing digital drawing image labor takeoff object steps percentage of completion representing, labor estimates, labor costs, material estimates, material costs, count items estimates, count items costs, and budget times and calendar fitments.

4. The interactive computer method for tracking a construction project progress of claim 1 further comprising updating of the digital estimate file of a construction project plan labor takeoff objects and object steps through real time direct screen entry by a supervisor observing actual physical completion of takeoff object steps at a remote site into a graphical scale on the computer screen.

5. The interactive computer method for tracking a construction project progress of claim 1 further comprising updating of the digital estimate file of a construction project plan labor takeoff objects steps percentage of completion through real time direct screen entry by a supervisor observing actual physical at a remote site into an object within a digital drawing image on the computer screen.

6. The interactive computer method for tracking a construction project progress of claim 1 further comprising monitoring of the digital estimate file of a construction project plan labor takeoff objects percentage of completion by a supervisor in real time at a remote site through a spread sheet display screen digitally linked to the project drawing on the computer screen.

7. The interactive computer method for tracking a construction project progress of claim 1 further comprising monitoring of the project percentage of completion progress on a handheld device displaying a collection of color and pattern coded plan labor takeoff objects percentage of completion within a site plan image display screen.

8. The interactive computer method for tracking a construction project progress of claim 1 further comprising the comparing of project percentage of completion progress as compared to previous project status through multiple types of viewing the handheld device display spread sheet with project cost codes and hours used through color and pattern-coded labor takeoff object steps for an on site supervisor and project manager real time communication and project monitoring awareness.

9. The interactive computer method for tracking a construction project progress of claim 1 further comprising the generating of digital file images containing labor takeoff object steps demonstrative of the project percentage of completion progress as compared to previous project status facilitating an on site supervisor choice of selectable formats including; change conditions, time cards, labor cost codes, site plans, percent complete and display screens for real time progress reporting.

10. The interactive computer method for tracking a construction project progress of claim 1 further comprising the real time interchange of digital files demonstrative of the project labor takeoff object steps percentage of completion progress facilitating an on site supervisor and a project manager choice of selectable formats and display screens for progress analysis.

11. An interactive computer product stored in a machine readable medium, for tracking a percentage of completion of a construction project labor takeoff object steps compared to previous project status through a site plan image drawing screen, that when executed by a computer performs the method comprising the steps of:

storing a digital estimation files of construction project drawings with project progress threshold designating embedded color and pattern-coded labor takeoff object steps displaying plans, objects, object steps, estimates, and budgets in a mobile interactive computer;

monitoring percent complete progress of the construction project through a digital centric computer screen display with numeric, graphical, color and pattern coded objects and steps;

updating labor takeoff object steps percentage of completion images, estimates, and budgets through a remote, onsite computer with a site supervisor observing physical completion of takeoff object steps and direct screen selection inputs as the project progress is achieved;

comparing the project labor takeoff object steps percentage of completion progress with the digital estimation file through computer visual screen displays with numeric, graphical, and color coded takeoff object steps within drawings displaying changing colors and patterns as project progress is achieved;

generating an updated graphical digital file image of the percentage of completion of object steps within drawings of the project progress as a function of the digital file image items, wherein the project progress further comprises:

a collection of labor takeoff object steps percentage of completion within an image displaying physical completion of the project progress, a color coded construction plan image containing labor takeoff objects and object steps associated labor and material costs wherein a takeoff object completion status is represented by tracking project progress related designated changing pattern and color coded takeoff objects steps incurred for said physical completion with solid color indicating over/under budget completion; and transferring in real time labor takeoff object steps percentage of completion information by network from remote sites to a project manager's office facilitating complete project status monitoring by takeoff object steps; wherein the completion information contains current drawings budget status, plans, estimates, and budget for immediate corrective action or adaptation of resources.

* * * * *